United States Patent
Jheng et al.

(10) Patent No.: US 9,769,750 B2
(45) Date of Patent: *Sep. 19, 2017

(54) ENHANCED UE DATA TRANSMISSION FOR POWER CONSUMPTION OPTIMIZATION

(71) Applicant: MEDIATEK INC., Hsinchu (TW)

(72) Inventors: Yu-Syuan Jheng, Taipei (TW); Chien-Chun Huang-Fu, Hsinchu (TW); Chia-Ming Chou, Changhua County (TW)

(73) Assignee: MEDIATEK INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/334,006

(22) Filed: Oct. 25, 2016

(65) Prior Publication Data

US 2017/0041872 A1 Feb. 9, 2017

Related U.S. Application Data (63) Continuation of application No. 13/896,591, filed on May 17, 2013, now Pat. No. 9,516,591.

(Continued)

(51) Int. Cl.
*H04W 52/02* (2009.01)
*H04W 28/02* (2009.01)
(Continued)

(52) U.S. Cl.
CPC ... *H04W 52/0212* (2013.01); *H04W 28/0221* (2013.01); *H04W 28/0273* (2013.01);
(Continued)

(58) Field of Classification Search
CPC ......... H04W 52/0212; H04W 28/0221; H04W 52/281; H04W 52/146; H04W 52/0258
See application file for complete search history.

(56) References Cited

U.S. PATENT DOCUMENTS 9,516,591 B2 * 12/2016 Jheng ............... H04W 52/0212
2007/0184858 A1    8/2007 Landschaft et al. .......... 455/466
(Continued)

FOREIGN PATENT DOCUMENTS

CN        101959290 A    1/2011
JP        2008131312     6/2008
(Continued)

OTHER PUBLICATIONS

International Search Report and Written Opinion of International Search Authority for PCT/CN2013/075823 dated Aug. 22, 2013(11 pages).

(Continued)

*Primary Examiner* — Mohammad Anwar
(74) *Attorney, Agent, or Firm* — Imperium Patent Works; Zheng Jin; Helen Mao (57) ABSTRACT

Methods for enhanced UE data transmission for power consumption optimization are disclosed. A UE detects UE conditions and determines a UE traffic characteristic. The UE performs power consumption optimization based on the traffic characteristic. In one novel aspect, based on the UE condition, the UE determines that the traffic characteristic is low priority traffic or mobile originated only traffic. In one embodiment, the UE aligns prescheduled low priority data transmission with mobility management messages, or group multiple low priority prescheduled data transmission together. In another embodiment, the UE reduces NAS retry process upon detecting application triggered low priority traffic. In another embodiment, the UE turns off RF module until next data transmission for MO only traffic. In another novel aspect, the UE detects and sends UE conditions to the network. The network determines a UE traffic characteristic and performs power consumption optimization accordingly.

14 Claims, 7 Drawing Sheets

Related U.S. Application Data (60) Provisional application No. 61/648,660, filed on May 18, 2012.

(51) Int. Cl.
*H04W 28/12* (2009.01)
*H04W 52/14* (2009.01)
*H04W 52/28* (2009.01)

(52) U.S. Cl.
CPC ....... *H04W 28/12* (2013.01); *H04W 52/0216* (2013.01); *H04W 52/0258* (2013.01); *H04W 52/146* (2013.01); *H04W 52/281* (2013.01); *Y02B 60/50* (2013.01)

(56) References Cited

U.S. PATENT DOCUMENTS

| | | | |
|---|---|---|---|
| 2007/0259673 A1 | 11/2007 | Willars et al. | 455/453 |
| 2008/0117851 A1 | 5/2008 | Irie et al. | 370/311 |
| 2010/0195579 A1 | 8/2010 | Park et al. | 370/329 |
| 2011/0069649 A1 | 3/2011 | Gobriel et al. | 370/311 |
| 2011/0077027 A1 | 3/2011 | Wang et al. | 455/456.3 |
| 2011/0116427 A1 | 5/2011 | Chang et al. | 370/311 |
| 2011/0201343 A1 | 8/2011 | Pinheiro et al. | 455/450 |
| 2011/0274058 A1 | 11/2011 | Diachina et al. | 370/329 |
| 2012/0023190 A1 | 1/2012 | Backholm et al. | 709/217 |
| 2012/0023226 A1 | 1/2012 | Petersen et al. | 709/224 |
| 2012/0033612 A1 | 2/2012 | Jazra | 370/328 |
| 2013/0003629 A1 | 1/2013 | Jeong et al. | 370/311 |
| 2013/0058320 A1 | 3/2013 | Motonami et al. | 370/338 |
| 2013/0100895 A1 | 4/2013 | Aghili et al. | 370/329 |
| 2013/0122905 A1 | 5/2013 | Casati et al. | 455/435.1 |
| 2014/0235226 A1 | 8/2014 | Pinheiro et al. | 455/418 |

FOREIGN PATENT DOCUMENTS

| | | |
|---|---|---|
| JP | 2013520102 | 5/2013 |
| JP | 2013529402 A | 7/2013 |
| JP | 2013530596 | 7/2013 |
| JP | 2013534071 | 8/2013 |
| JP | 2013539267 A | 10/2013 |
| JP | 2013541238 | 11/2013 |
| WO | WO2011100570 A1 | 8/2011 |
| WO | WO2011125175 A1 | 10/2011 |
| WO | WO2011138238 | 11/2011 |
| WO | WO2011141835 | 11/2011 |
| WO | WO2012018430 | 2/2012 |

OTHER PUBLICATIONS

JPO, Office Action for the JP patent application 2015-511920 (no English translation is available) dated Oct. 13, 2015 (3 pages).
EPO, Search Report for the EP patent application 13790054.4 dated Dec. 15, 2015 (6 pages).
JPO, Office Action for the JP patent application 2015-511920 dated Jun. 28, 2016 (6 pages).
JPO, Office Action for the JP patent application 2015-511920 dated Mar. 14, 2017 (6 Pages).
SIPO, Office Action for the CN patent application 201380009167.8 (no English translation is available) dated Apr. 6, 2017 (7 pages).

\* cited by examiner

ENHANCED UE DATA TRANSMISSION FOR POWER CONSUMPTION OPTIMIZATION

CROSS REFERENCE TO RELATED APPLICATIONS

This application is a continuation, and claims priority under 35 U.S.C. §120 from nonprovisional U.S. patent application Ser. No. 13/896,591, entitled "ENHANCED UE DATA TRANSMISSION FOR POWER CONSUMPTION OPTIMIZATION," filed on May 17, 2013, the subject matter of which is incorporated herein by reference. Application Ser. No. 13/896,591, in turn, claims priority under 35 U.S.C. §119 from U.S. Provisional Application No. 61/648,660, entitled "Enhanced UE Data Transmission for Power Consumption Optimization," filed on May 18, 2012, the subject matter of which is incorporated herein by reference.

TECHNICAL FIELD

The disclosed embodiments relate generally to mobile communication networks, and, more particularly, to enhanced UE data transmission for power consumption optimization.

BACKGROUND

The exponential growth of mobile data, both in terms of mobile subscribers and mobile data traffic, requires substantial increase of network capability and efficiency. The rapid uptake of Smartphone subscribers and the launch of different types of mobile devices such as machine type communication (MTC) devices put additional pressure on the existing mobile data network. Specifically, applications in modern Smartphones constantly poll the network for background traffic even when users are inactive, resulting in huge amount of signaling traffic. Today, the network faces network congestion problems resulting in lower data rate, failed calls and slow response time.

Long Term Evolution (LTE) is an improved universal mobile telecommunication system (UMTS) that provides higher data rate, lower latency and improved system capacity. In the LTE system, an evolved universal terrestrial radio access network includes a plurality of base stations, referred as evolved Node-Bs (eNBs), communicating with a plurality of mobile stations, referred as user equipment (UE). A UE may communicate with a base station or an eNB via the downlink and uplink. The downlink (DL) refers to the communication from the base station to the UE. The uplink (UL) refers to the communication from the UE to the base station.

Despite the improvements in the LTE system, it still faces capacity and efficiency problems with the rapid growth of different mobile users. Moreover, the UE in the mobile network faces increasing problems of battery efficiency. The modern Smartphone supports various types of mobile applications. These applications have different traffic characteristics. A lot of them do not use the network resource efficiently and cause the UE battery efficiency drop dramatically. In the third generation (3G) mobile network, a user device (UE) needs to perform a series of signaling procedures for data transmission, such as the radio resource connection (RRC), the attach procedure, the identification procedure, the authentication procedure, and data path establishment procedures. These procedures consumes large amount of network resource as well as UE batteries. Many mobile data applications today send and receive small data but still requires large amount of signaling process. Another example is MTC applications, which generate regular data transmissions at predefined time intervals and perform attach/detach procedures in the network for each transmission. These applications significantly increases network signaling overhead. UE battery life becomes a major concern because many of the background traffic and background applications are not optimized for battery consumption. Optimization for UE power consumption is required with the increased popularity of various mobile applications.

SUMMARY

Methods for enhanced UE data transmission for power consumption optimization are disclosed. A user equipment (UE) detects one or more predefined UE conditions in a mobile communication network. The UE then determines a UE traffic characteristic. The UE performs power consumption optimization for a specific transmission procedure based on the determined traffic characteristic.

In one novel aspect, based on the detected UE condition, the UE determines that the traffic characteristic is low priority traffic. In one embodiment, upon detecting low priority traffic, the UE aligns periodic transmission with mobility management (MM) messages. In another embodiment, the UE groups multiple periodic transmissions together for low priority traffic. In another embodiment, the UE further identifies whether the data transmission is triggered by an application rather than by user interaction. If so, the UE reduces retry attempts of non-access-stratum (NAS) procedures.

In another novel aspect, the UE determines that the traffic characteristic is mobile originated (MO) only traffic. The UE performs power consumption optimization for MO only traffic. In one embodiment, upon detecting MO only traffic, the UE turns off RF module right after the data transmission until the next data transmission. In another embodiment, the UE sends MO-Service-Only or Attach-When-Needed indications or information elements (IEs) in the messages to the network.

In other novel aspects, the UE detects and sends UE conditions to the network. Upon receiving the UE conditions, the network determines UE traffic characteristic and performs UE power consumption optimization. In one embodiment, the UE indicates Attach-When-Needed in ATTACH REQUEST message and an optional implicit detach timeout value. The network performs either an explicit detach procedure, or an implicit detach procedure.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
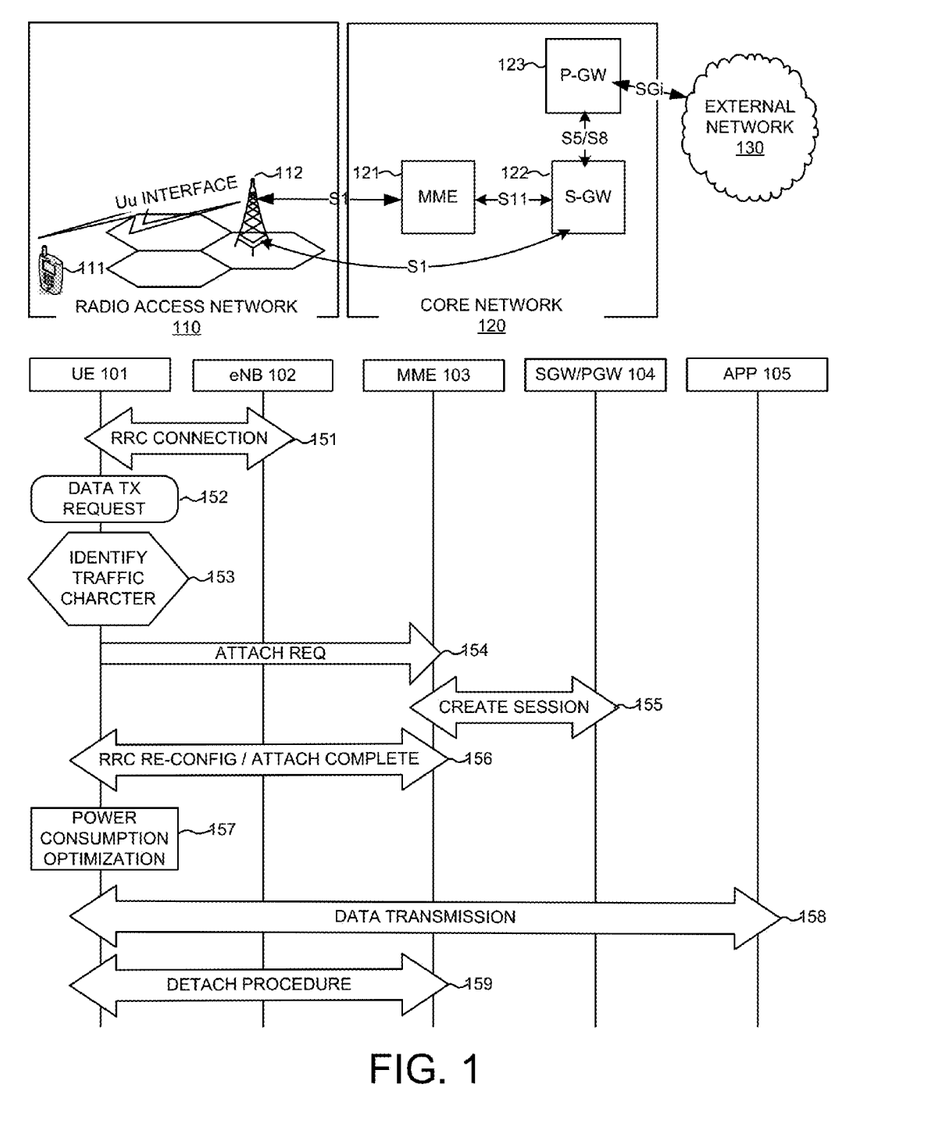
FIG. 1 schematically shows a system diagram of a wireless network in accordance with a novel aspect.

FIG. 1 schematically shows a system diagram of a wireless network in accordance with a novel aspect. A wireless System includes a radio access network 110, a core network 120 and an external network 130. UE 111 connects to eNB 112 via Uu interface. eNB 112 connects with Mobility Management Entity (MME) 121 and Serving Gateway (S-GW) 122 via S1 interfaces. MME 121 connects with S-GW 122 via S11 interface. S-GW 122 further connects with P-GW 123 via S5/S8 interface. P-GW 123 connects with external network 130 via SGi interface. FIG. 1 further shows exemplary system procedures in accordance with the current invention. At step 151, UE 101 connects with eNB 102 and establishes RRC connection. At step 152, applications on UE 101 start data transmission request. Different data transmissions have different traffic characteristics. In accordance with embodiments of the current invention, it is important to differentiate different types of data transmission request. At step 153, UE 101 identifies the traffic characteristic of the data request. At step 154, UE 101 sends ATTACH REQUEST to MME 103, via eNB 102. In accordance with embodiments of the current invention, UE 101 can indicate the traffic characteristic in the ATTACH REQUEST message to the network. Such indication can also be included in other Non-Access Stratum (NAS) messages. Upon receiving ATTACH REQUEST, MME 103 creates session with SGW and PGW 104. The session creation procedure may also include authentication, encryption and other security procedures. Upon successful session creation, at step 156, MME 103 and UE 101 exchange messages to complete attach procedure. UE 101 and eNB 102 also exchange messages to perform RRC re-configuration according to the parameters from the attach procedure. At step 157, UE 101 performs power consumption optimization. These optimizations are based on the different transmission procedures and the traffic characteristic identified earlier.

Figure 2:
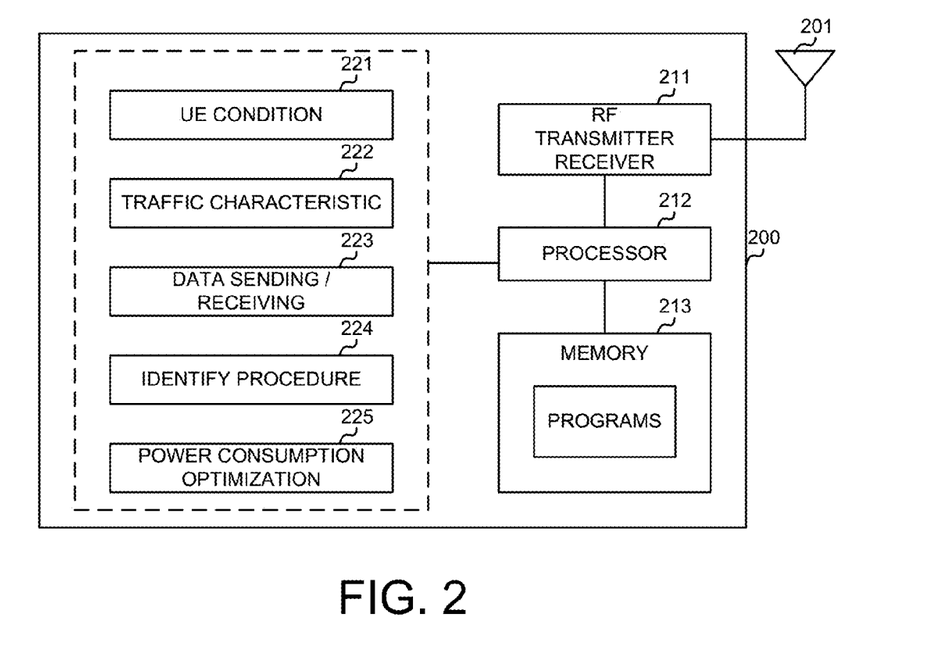
FIG. 2 shows an exemplary block diagram of a UE that supports some embodiments of the invention.

FIG. 2 shows an exemplary block diagram of a UE that supports some embodiments of the invention. The UE has RF transceiver module 211, coupled with antenna 201 receives RF signals from antenna 201, converts them to baseband signals and sends them to processor 212. RF transceiver 201 also converts received baseband signals from the processor 212, converts them to RF signals, and sends out to antenna 201. Processor 212 processes the received baseband signals and invokes different functional modules to perform features in the UE. Memory 213 stores program instructions and data to control the operations of the UE. FIG. 2 further illustrates five functional modules 221 to 225 in the UE that carry out embodiments of the current invention. The functional modules may be implemented by hardware, firmware, software, or any combination thereof.

FIG. 2 further shows five functional modules that implements embodiments of the current invention. UE condition module 221 detects UE conditions, which are related to predefined traffic characteristics. These UE conditions can be preconfigured and/or can be dynamically configured/updated by the system. UE condition module 221 can be configured to collect these conditions from different modules in UE, such as hardware status, application messages, application-programming interfaces (APIs) from other internal modules or any other means that is available to the UE. Traffic characteristic module 222 determines a traffic characteristic for the UE. Traffic characteristic module 222 evaluates UE conditions and determines traffic characteristic of the UE. The traffic characteristics can be a preconfigured set and/or can be dynamically configured/updated by the system. The determination algorithms can be preconfigured and/or can be dynamically updated. Data sending/receiving module 223 sends or receives data transmissions to/from the UE. In accordance to embodiments of the current invention, data sending/receiving module 223 interfaces with other modules in the UE to implement power consumption optimizations. Identify module 224 identifies a data transmission procedure that is configured to perform power consumption optimization. The identification can be a simple hook in the program that enables it to perform some predefined power consumption optimization. It can be embedded in the software and firmware or it can be configured or dynamically updated. Power consumption optimization module 225 performs power consumption optimization. In one novel aspect, upon identifying a specific procedure in the UE, the UE performs corresponding power consumption optimization based on the determined traffic characteristic.

An important step to improve battery life and to increase network efficiency is to differentiate different data traffic types and perform data transmission procedures accordingly. Therefore, it is important to identify a traffic characteristic first.

Figure 3:
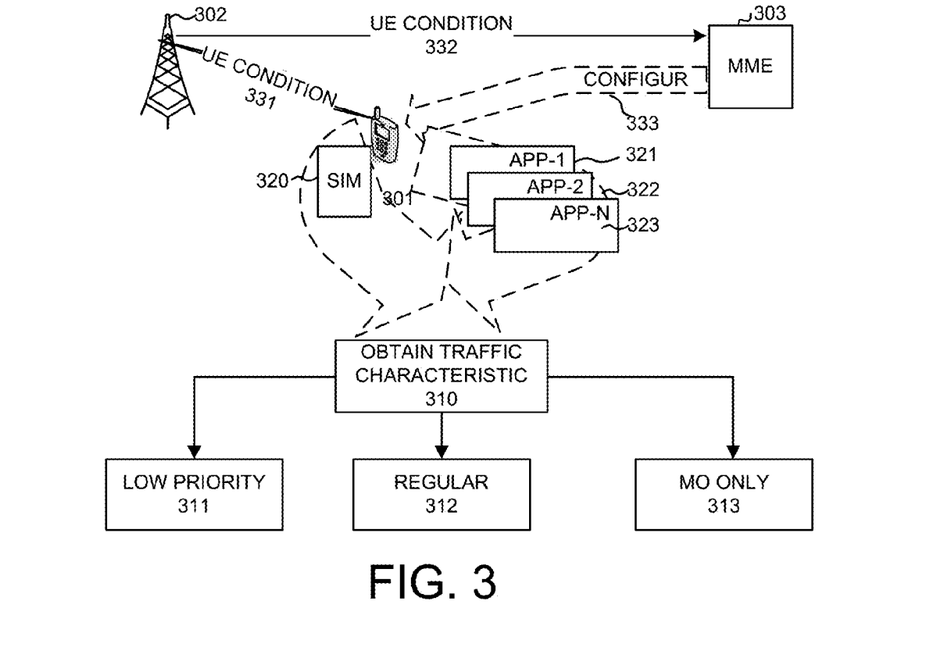
FIG. 3 shows an exemplary block diagram in accordance with embodiments of the current invention where the UE identifies different traffic characteristic from different sources.

FIG. 3 shows an exemplary block diagram in accordance with embodiments of the current invention where the UE identifies different traffic characteristic from different sources. UE 301 connects with eNB 302, which connects with MME 303. UE 301 has a subscriber identity module (SIM) card 320. Most SIM card for a UE contains subscriber information, such as International Mobile Subscriber Identity (IMSI) and service feature set. The service features normally are configured when the user signed up for service at a service provider. It contains details about the subscribed services and features. The service and feature information on the SIM card can be important information indicating traffic characteristics. For example, the service may indicate that UE 301 is configured to be a MTC device or it can be configured as a mobile-originated (MO) or mobile-terminated only device. UE 301 can also be configured to be power efficiency mode, or allow signaling or data to be sent in low priority. UE 301, upon retrieving the service and feature information from the SIM card, can determine that the traffic characteristic is of low priority. UE 301 can be configured to identify dynamically new features and services retrieved from the SIM card. Such dynamic identification applies for re-categorization of feature set, adding or updating feature set and updating and adding traffic characteristic sets. Such traffic characteristic related feature and service information can also be received through configuration messages, such device management (DM) messages from Operations, Administration and Maintenance (OAM) interface. UE 301 upon receiving these messages can identify traffic characteristic accordingly.

UE 301 can further identify traffic characteristic by analyzing applications running on UE 301. APP-1 321, APP-2 322, and APP-N 323 represent multiple applications running on UE 301. There can be several applications running on UE 301 at a time. Some of these applications are background applications started by other applications on UE 301. Some applications are user initiated interactive traffic. Some applications involve large data traffic while some involves small sized data transmission. Some applications send periodic traffic. Some applications are triggered by an application instead of by the user. These UE conditions can be used to determine that the UE traffic characteristic is of low priority. There are many ways to identify traffic characteristic by analyzing specific applications on the UE 301. For example, UE 301 can use certain algorithm to determine whether the traffic is triggered by application only. UE 301 can look at the traffic data length. UE 301 can also analyze data contents of the package to determine whether it is triggered by an application. Some the applications has labels for application properties. UE 301 can also use these labels to determine whether it is application triggered. As another example, access point name (APN) of each application can indicate traffic characteristic. UE 301 can determine traffic characteristics by categorizing APN. Such categorization can be preconfigured or dynamically updated. Further, UE 301 can configure a predefined data size threshold, or a bandwidth threshold. UE 301 upon receiving transmission requests from an application can compare its data transmission size and/or bandwidth requirement to determine whether it is smaller than the preconfigured threshold. If so, UE 301 can identify the traffic being low priority traffic. Other indications such as background traffic from an application can also be used to identify low priority traffic. In one example, UE 301 upon detecting that all active applications generate MO only communication can identify MO only traffic characteristic. Other UE internal status indicator can also be used to identify traffic characteristic. For example, UE hardware status can indicate that UE is in sleep or deep sleep mode. Such indications are factors in determining UE traffic characteristic.

Another way to identify UE traffic characteristic is through network configuration. In one novel aspect, UE 301 collects UE traffic conditions and sends these conditions to eNB 302 at step 331. Such UE conditions may include traffic size, UE hardware status, APN information, UE interactive or non-interactive mode and any other traffic related information. At step 332, eNB 302 forward these UE traffic conditions to MME 303. MME 303 analyzes this information and determines a UE traffic characteristic. At step 333, MME 303 sends configuration message to UE 301 regarding UE traffic characteristic. It is understood to one of ordinary skills in the art that other network entities can also be configured to receive and determine UE traffic characteristic similarly. Other network configuration methods may include over the air (OTA) configuration indicating a low priority or MO only device. System configuration messages, signaling messages or broadcast messages from the network can also instruct the UE to configure the device as an MO only device or configure the UE to other predefined type. Although MME is used to perform network functions, it is understood by one of ordinary skills in the art that any other network entities may also be configured to perform the same or similar functions as described here.

UE 301, at step 310, obtains UE traffic characteristic through the means mentioned above. It further categorizes the UE traffic as low priority traffic at step 311, or as regular traffic at step 312, or as MO only traffic at step 313. These three categories are exemplary identifications. UE 301 can be dynamically configured to identify more or less traffic characteristic. The identification algorithm can be predefined and/or dynamically updated.

Figure 4:
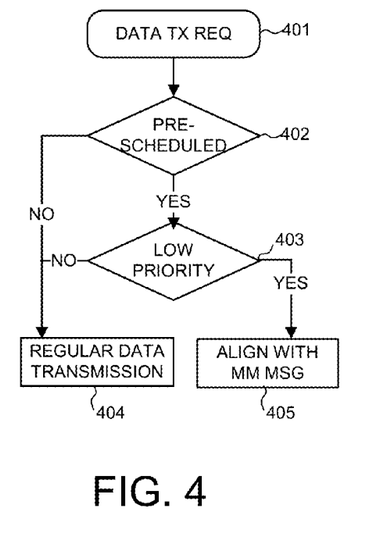
FIG. 4 shows an exemplary flow diagram of UE power consumption optimization by aligning low priority traffic with Mobility Management (MM) messages.

Upon identifying UE traffic characteristic, the UE can perform specific actions to optimize UE battery consumption. FIG. 4 shows an exemplary flow diagram of UE power consumption optimization by aligning low priority traffic with Mobility Management (MM) messages. At step 401, the UE detects a data transmission request. At step 402, the UE determines if the data transmission request is for a prescheduled application. Such prescheduled application normally transmits data package periodically at certain prescheduled time interval. If the traffic is not prescheduled and no other related traffic characteristic is detected, the UE may send the traffic regularly. If at step 402, the UE detects that the data request is for a prescheduled data transmission, the UE further determines if the traffic is low priority traffic by using the methods discussed above. If it is not low priority traffic, the UE moves to step 404 and sends the data traffic regularly. If at step 403, the UE determines it is low priority traffic, the UE moves to step 405 and aligns the data transmission with a MM message.

Figure 5:
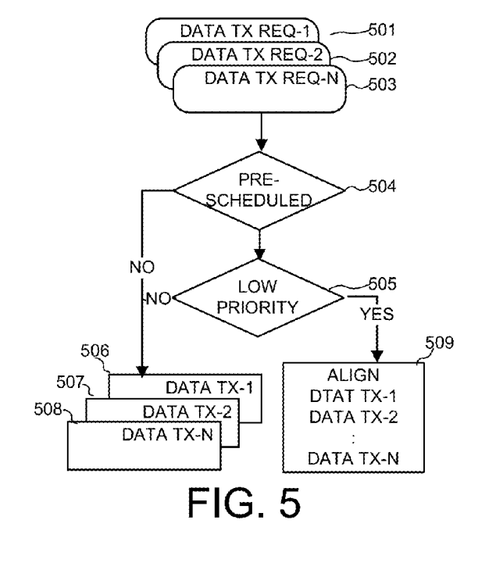
FIG. 5 shows an exemplary flow diagram of UE power consumption optimization by aligning multiple low priority data transmission together.

FIG. 5 shows an exemplary flow diagram of UE power consumption optimization by aligning multiple low priority data transmissions together. The UE detects multiple data transmission requests. As an example, the UE receives data transmission request-1 501, data transmission request-2 502, and data transmission request-N 503. At step 504, the UE determines whether these data transmission requests are prescheduled. If they are not prescheduled and no other related traffic characteristic are detected, the UE transmits regularly by sending the data transmission-1 at step 506, transmits the data transmission-2 at step 507, and transmits the data transmission-N at step 508. If at step 504, the UE determines the data transmission requests are prescheduled, the UE determines whether these data transmissions are low priority traffic at step 505. If at step 505, the UE determines that these are not low priority traffic, the UE transmits regularly by sending the data transmission-1 at step 506, transmits the data transmission-2 at step 507, and transmits the data transmission-N at step 508. If the UE at step 505 determines that these are low priority traffic, the UE moves to step 509, aligns the multiple data transmissions and sends them together. FIG. 5 shows an exemplary case where the power consumption optimizations at step 509 occurs when all data transmission requests are simultaneously identified as prescheduled and low priority. It is understood by one of ordinary skills in the art that the UE can apply the optimization action to any number of data transmissions that are identified as prescheduled and low priority while transmitting the other traffic regularly.

Figure 6:
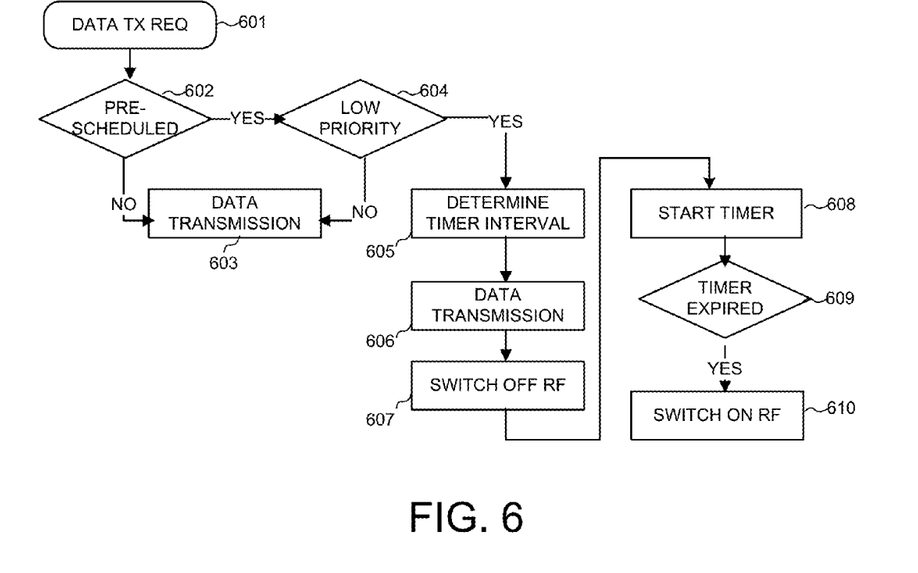
FIG. 6 shows another exemplary flow diagram of UE power consumption optimization by switching off radio frequency (RF) module periodically for low priority pre-scheduled traffic.

FIG. 6 shows another exemplary flow diagram of UE power consumption optimization by switching off radio frequency (RF) module periodically for low priority prescheduled traffic. At step 601, the UE receives data transmission request. At step 602, the UE determines whether the data transmission is a prescheduled traffic. If not and no other related traffic characteristic, the UE moves to step 603 and sends the data transmission regularly. If at step 602, the UE detects the data transmission is a prescheduled traffic, the UE determines whether it is low priority at step 604. If it is not low priority traffic, the UE moves to step 603 and sends the data transmission regularly. If at step 604 the UE determines that it is low priority traffic, the UE performs battery consumption optimization by moving to step 605. At step 605, the UE determines a timer interval for the prescheduled data transmission. At step 606, the UE transmits the data. After the data transmission is done, at step 607, the UE switches off the RF module. At step 608, the UE starts a timer with the timer interval for the prescheduled traffic. At step 609, the timer expired. At step 610, the UE switches on the RF module.

Figure 7:
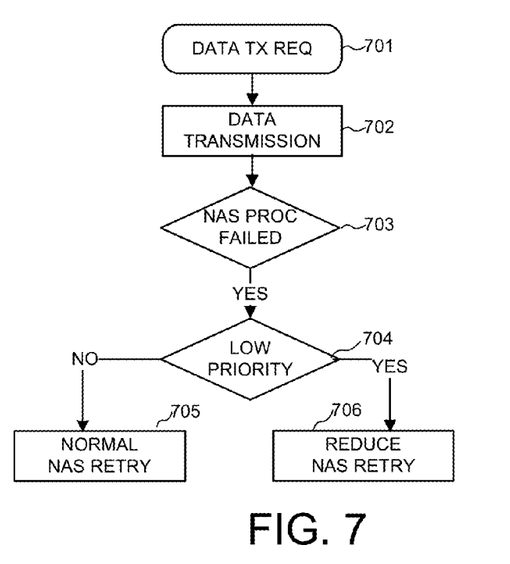
FIG. 7 shows an exemplary flow diagram of a UE power consumption optimization for low priority traffic by reducing the number of times to retry NAS message when the NAS procedure is triggered by an application.

FIG. 7 shows an exemplary flow diagram of a UE power consumption optimization for low priority traffic by reducing the number of times to retry NAS message when the NAS procedure is triggered by an application. At step 701, the UE receives a data transmission request. At step 702, the UE transmits the data. At step 703, the UE determines whether an NAS procedure failed. At step 704, the UE determines whether the data transmission is of low priority. If at step 704, the UE determines that the data transmission is not of low priority, the UE moves to step 705 and enters a normal NAS retry procedure. If at step 704, the UE determines the data transmission is of low priority, the UE moves to step 706 and performs UE battery consumption optimization by reducing the NAS retry number.

Figure 8:
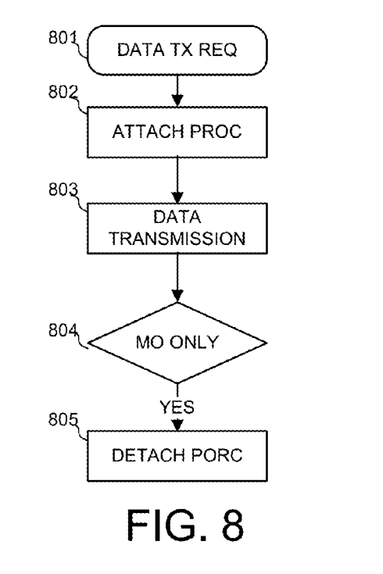
FIG. 8 shows an exemplary flow diagram of a UE power consumption optimization for MO only traffic by detaching the UE right after the data transmission.

FIG. 8 shows an exemplary flow diagram of a UE power consumption optimization for MO only traffic by detaching the UE right after the data transmission. At step 801, the UE receives a data transmission request. At step 802, the UE performs the attach procedure. At step 803, the UE transmits the data. At step 804, the UE determines whether the traffic characteristic is MO only. If at step 804 the UE determines that it is MO only traffic, the UE moves to step 805 and performs the detach procedure.

Figure 9:
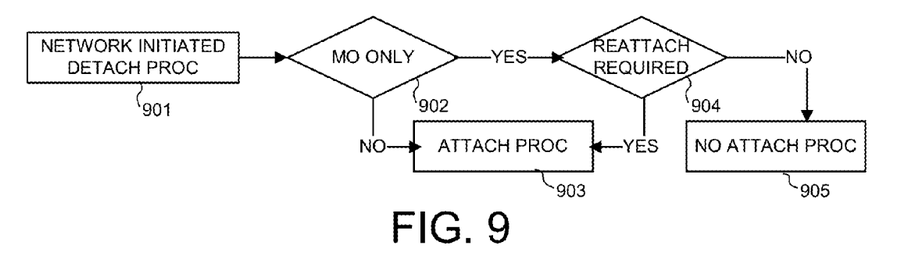
FIG. 9 shows an exemplary flow diagram of a UE power consumption optimization for MO only traffic by not attempting attach procedure if the UE detached by the network initiated detach procedure without reattach required.

FIG. 9 shows an exemplary flow diagram of a UE power consumption optimization for MO only traffic by not attempting attach procedure if the UE is detached by the network initiated detach procedure without reattach required. At step 901, the UE enters a network initiated detach procedure. At step 902, the UE determines whether it is MO only traffic. If the UE determines that it is not MO only traffic, the UE will initiates attach procedure normally when needed. If at step 902, the UE determines that it is MO only traffic, it moves to step 904 to check if reattach required is indicated in the network initiated detach procedure. If at step 904, the UE determines that the reattach required is included in the network initiated detach procedure, the UE moves to step 903, where the UE would enter attach procedure normally when needed. If at step 904, the UE determines that there is no indication of reattach required in the network initiated detach procedure, the UE moves to step 905 and performs UE battery consumption optimization by not retrying attach procedure.

Figure 10:
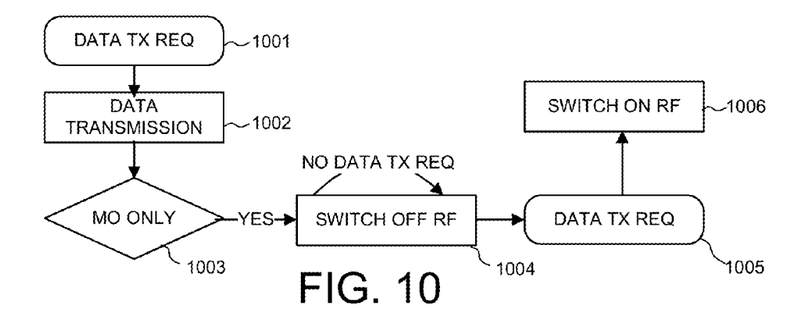
FIG. 10 shows an exemplary flow diagram of a UE power consumption optimization for MO only traffic by switching off RF module right after a data transmission until the next data transmission request.

FIG. 10 shows an exemplary flow diagram of a UE power consumption optimization for MO only traffic by switching off RF module right after a data transmission until the next data transmission request. At step 1001, the UE receives a data transmission request. At step 1002, the UE performs the data transmission. At step 1003, the UE determines whether it is MO only traffic. If step 1003 determines that it is MO only traffic, the UE moves to step 1004 by switching off the RF module. The UE stays in the RF module off state as long as there is no other data transmission request. At step 1005, the UE receives another data transmission request. At step 1006, the UE switch on the RF module for the data transmission.

Figure 11:
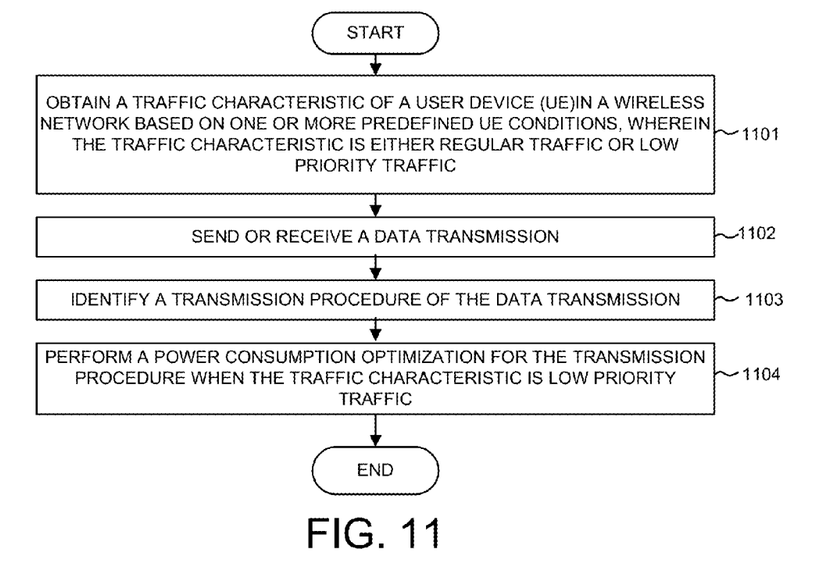
FIG. 11 shows an exemplary flow chart in accordance to embodiments of the current invention where the UE detects low priority traffic and performs UE power consumption optimization accordingly.

The above examples shows specific steps for UE power consumption optimization based on UE traffic characteristic. FIG. 11 shows an exemplary flow chart in accordance to embodiments of the current invention where the UE detects low priority traffic and performs UE power consumption optimization accordingly. At step 1101, the UE obtains a traffic characteristic of a user equipment (UE) in a wireless network based on one or more predefined UE conditions, wherein the traffic characteristic indicates regular traffic or low priority traffic. At step 1102, the UE sends or receives a data transmission. At step 1103, the UE identifies a transmission procedure of the data transmission. At step 1104, the UE performs a power consumption optimization for the transmission procedure when the traffic characteristic is low priority traffic.

Figure 12:
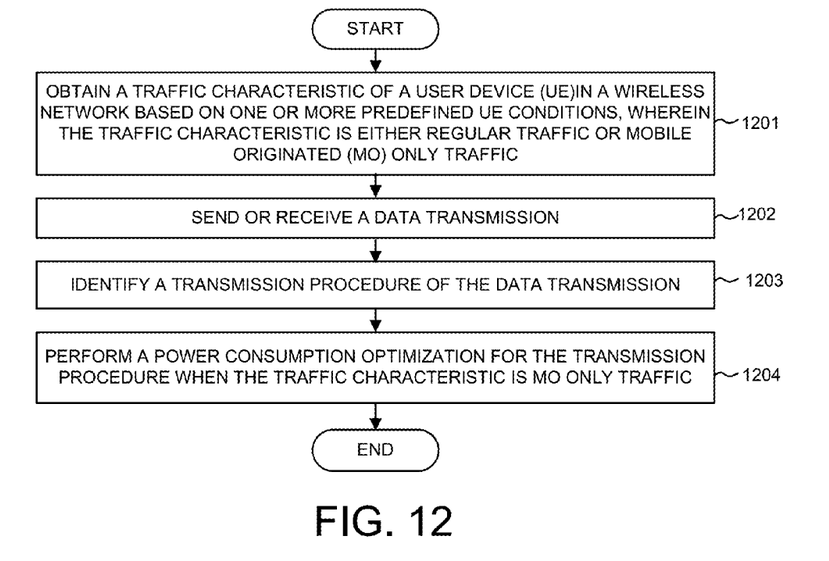
FIG. 12 shows an exemplary flow chart in accordance to embodiments of the current invention where the UE detects MO only traffic and performs UE power consumption optimization accordingly.

FIG. 12 shows an exemplary flow chart in accordance to embodiments of the current invention where the UE detects MO only traffic and performs UE power consumption optimization accordingly. At step 1201, the UE obtains a traffic characteristic of a user device (UE) in a wireless network based on one or more predefined UE conditions, wherein the traffic characteristic indicates regular traffic or mobile originated (MO) only traffic. At step 1202, the UE sends or receives a data transmission. At step 1203, the UE identifies a transmission procedure of the data transmission. At step 1204, the UE performs a power consumption optimization for the transmission procedure when the traffic characteristic indicates MO only traffic.

The UE can detect different UE conditions that indicate certain traffic characteristic. Based on such UE conditions, the UE can determine internally the traffic characteristic. The advantage of such implementation is that the UE has full control and can use the locally detected conditions without further message exchanges. Alternatively, the UE can send the detected UE conditions to the network. The network, upon receiving these conditions can use its own algorithm to determine a UE traffic characteristic. The network can either inform UE of the determined traffic characteristic or take a step further by sending direct command to the UE based on the traffic characteristic. Such implementation requires additional message exchanges. However, since the network potentially can gather more information, it is at a better position to have a more comprehensive and better algorithm. Further, it is easy to update dynamically the algorithm from a system level, such as newly developed features. The following sessions discuss in details some exemplary implementations where the network gathers UE conditions and involves in the UE power consumption optimization. It is understood by one of ordinary skills in the art that a system can choose to have a pure UE only implementation, a network only implementation, or a combination of both, where the UE makes the decision in certain situations while the network makes decisions in other situations. Further although eNB is shown as the entity exchanging information with the UE in the following sessions, the functions depicted below can be performed by other appropriate network entities.

Figure 13:
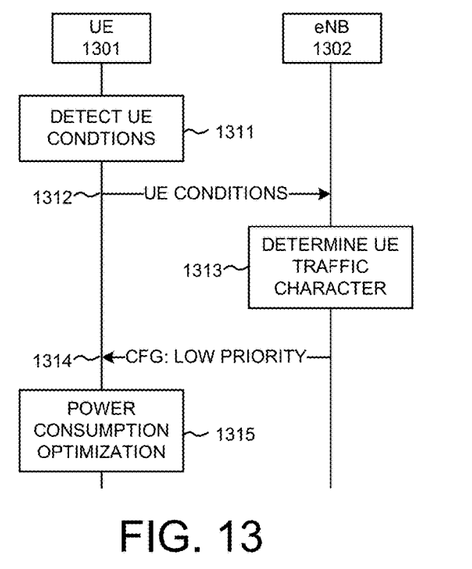
FIG. 13 shows a flow chart where the UE sends UE conditions to the network and the network configures UE based on the received UE conditions.

FIG. 13 shows a flow chart where the UE sends UE conditions to the network and the network configures UE based on the received UE conditions. UE 1301 connects with eNB 1302. At step 1311, UE 1301 detects UE conditions that are related to certain traffic characteristics. At step 1312, UE 1301 sends the detected UE conditions to eNB 1302. The messages exchange can be of any form of supported messages between the UE and the network. For example, NAS messages, RRC messages and/or OAM DM messages can be used to support this function. At step 1313, eNB 1302, or any other appropriate network entities, upon receiving the UE conditions, determines the UE traffic characteristic. The determination can be based on the UE condition alone, or can be based on the UE conditions and other information the network has. Upon determining a UE traffic characteristic, at step 1314, eNB 1302 sends the configuration information to UE 1301. The configuration message may indicate that the traffic characteristic is of low priority. Upon receiving the configuration message, at step 1315, UE 1301 performs power consumption optimization accordingly. The configuration message at step 1314 can further include detailed commands to the UE to perform some specific actions.

Figure 14:
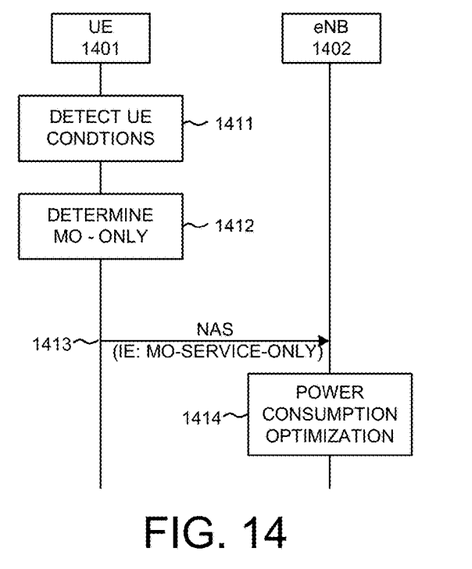
FIG. 14 shows a flow chart where the UE includes a MO-Service-Only indication or information element (IE) in an NAS message.

FIG. 14 shows a flow chart where the UE includes a MO Service Only indication in a NAS message. UE 1401 connects with eNB 1402. At step 1411, UE 1401 detects UE conditions that are related to UE traffic characteristic. At step 1412, UE 1401 determines that the traffic characteristic is MO only based on the detected UE conditions. At step 1413, UE 1401 includes an MO-Service-Only indicator and/or information element (IE) in a NAS message sending to the network. For example, the MO-Service-only indicator can be included in Tracking Area Update Request message, Attach Request, or Service Request messages. Upon receiving the MO-Service-Only indicator or IE, eNB 1402, at step 1414, performs power consumption optimization accordingly.

Figure 15:
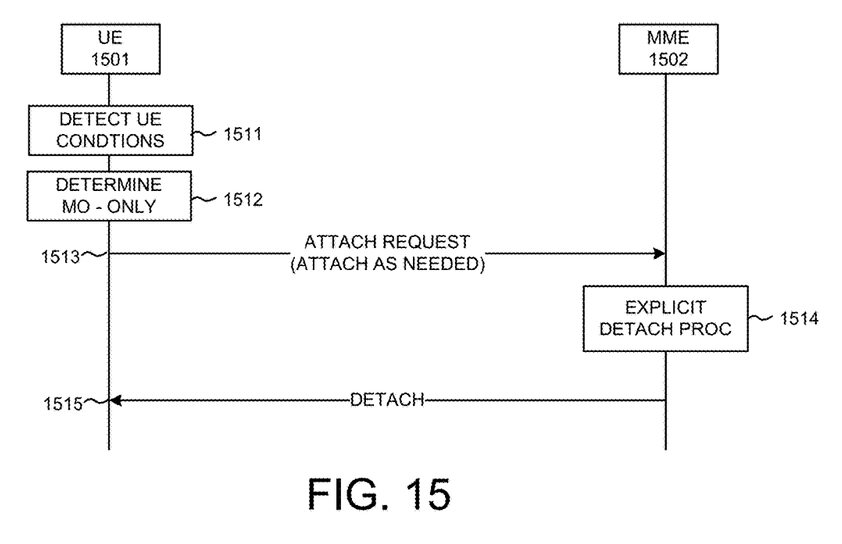
FIG. 15 shows a flow chart where the UE indicates attach-when-needed and the network performs an explicit detach procedure.

FIG. 15 shows a flow chart where the UE indicates attach-when-needed and the network performs an explicit detach procedure. UE 1501 connects with MME 1502 via an eNB. At Step 1511, UE 1501 detects UE conditions that are related to certain traffic characteristics. At step 1512, UE 1501 determines that the traffic characteristic is MO only. At step 1513, UE 1501 performs an attach procedure by sending ATTACH REQUEST to MME 1502. In one example, UE 1501 indicates attach-as-needed in the ATTACH REQUEST message to the network. At step 1514, MME 1502 determines to perform an explicit detach procedure when the data transmission is done based on the attach-when-needed indication received from UE 1501. At step 1515, MME 1502 initiated an explicit detach procedure. The explicit detach procedure described here also applies when UE indicates MO-Service-Only to the network.

Figure 16:
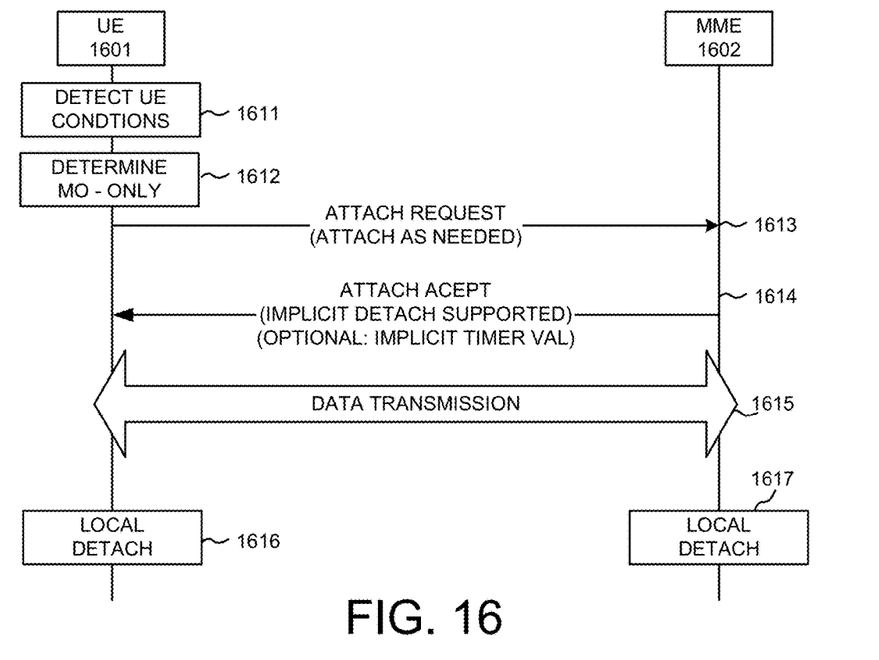
FIG. 16 shows a flow chart where the UE indicates attach-when-needed and the network performs an implicit detach procedure.

FIG. 16 shows a flow chart where the UE indicates attach-when-needed and the network performs an implicit detach procedure. UE 1601 connects with MME 1602 via an eNB. At step 1611, UE 1601 detects UE conditions that are related to certain traffic characteristics. At step 1612, UE 1601 determines that the traffic characteristic is MO only. At step 1613, UE 1601 sends ATTACH REQUEST to MME 1602 indicating attach-when-needed in the ATTACH REQUEST message. At step 1614, MME 1602 sends ATTACH ACCEPT message to UE 1601. In one example, MME 1602 includes an implicit detach supported indicator in ATTACH ACCEPT message. At step 1603, UE 1601 and MME 1602 exchanges data transmissions. Upon completion of the data transmission, at step 1616, UE 1601 performs local detach procedure without exchange further signaling message with MME 1602. At step 1617, MME 1602 performs local detach procedure without exchange further signaling message with UE 1601. In another example, MME 1602 may optionally include an additional implicit detach timeout value in the ATTACH ACCEPT message. In this example, right after RRC release, both UE 1601 and MME 1602 start a timer with the implicit timer value. UE 1601 and MME 1602 performs local detach procedure independently upon timer expires without exchanging other messages. The implicit detach procedure described here also applies when UE indicates MO-Service-Only to the network.

Figure 17:
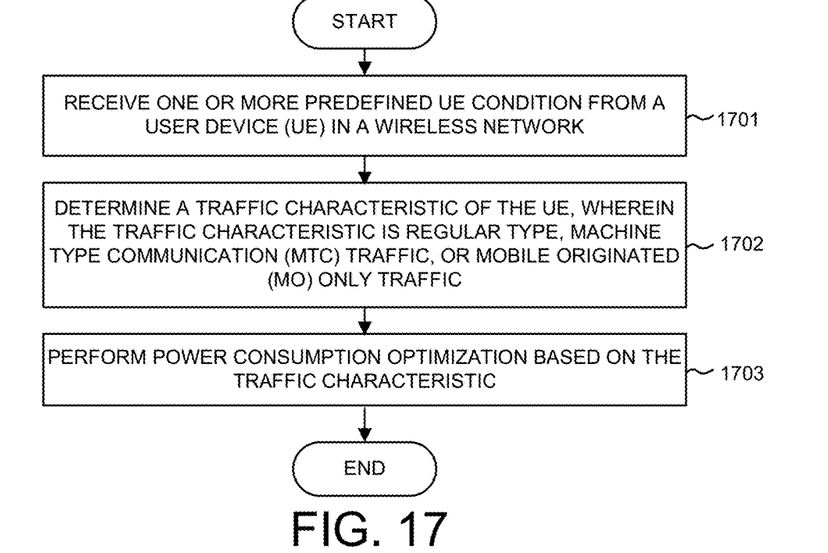
FIG. 17 shows an exemplary flow chart in accordance to embodiments of the current invention where an eNB receives UE conditions, determines traffic characteristics of the UE, and performs UE power consumption optimization accordingly.

FIG. 17 shows an exemplary flow chart in accordance to embodiments of the current invention where an eNB receives UE conditions, determines traffic characteristics of the UE, and performs UE power consumption optimization accordingly. At step 1701, the eNB receives one or more predefined UE conditions from a user device (UE) in a wireless network. At step 1702, the eNB determines a traffic characteristic of the UE based on the UE conditions, wherein the traffic characteristic indicates regular traffic, low priority traffic, or mobile originated (MO) only traffic. At step 1703, the eNB performs power consumption optimization based on the traffic characteristic.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   obtaining a set of traffic characteristics for multiple transmission procedures by a user equipment (UE) in a wireless network based on one or more predefined UE conditions, wherein each traffic characteristic indicates regular traffic or low priority traffic;
   identifying one or more transmission procedures as low priority traffic upon detecting at least one predefined UE conditions comprising: a transmission data size is smaller than a predefined threshold, a required bandwidth or throughput is smaller than a predefined threshold, an application ID indicating a predefined small-size data transmission, a data transmission triggered by an application, an access point name (APN) indicating small-size or low priority data transmission, a UE subscription information indicating the UE being an mobile originated (MO) only or mobile terminated (MT) only device, and a hardware status indicating power saving mode; and performing one or more corresponding procedure-based power consumption optimizations for the identified one or more low priority traffic transmission procedures, wherein each corresponding procedure-based power consumption optimization is for the specific identified low priority traffic transmission based on the corresponding traffic characteristic.

2. The method of claim 1, wherein the low priority traffic transmission procedure is sending or receiving the data transmission in a pre-scheduled period, and wherein the power consumption optimization involves aligning the data transmission with mobility management procedures by the UE or aligning the data transmission from multiple applications in the same period.

3. The method of claim 1, wherein the low priority traffic transmission procedure is sending or receiving the data transmission in a pre-scheduled period, and wherein the power consumption optimization comprises:
obtaining application properties of the data transmission;
determining a timer interval for the data transmission; and
switching off radio frequency (RF) capability after the data transmission until the next data transmission.

4. The method of claim 1, wherein the low priority traffic transmission procedure is sending or receiving the data transmission, and wherein the power consumption optimization involves reducing retry attempts of NAS procedures.

5. The method of claim 1, wherein obtaining the traffic characteristics involves receiving a configuration from the network indicating low priority traffic.

6. The method of claim 1, wherein obtaining the traffic characteristics involves retrieving a configuration information from a subscriber identity module (SIM) card indicating low priority traffic.

7. A method, comprising:
obtaining a traffic characteristic of a user device (UE) in a wireless network based on one or more predefined UE conditions, wherein the traffic characteristic indicates regular traffic or mobile originated (MO) only traffic;
identifying a transmission procedure as a MO only traffic upon detecting at least one predefined conditions comprising: all active applications generating MO only communication, receiving a broadcast information or an in-band signaling indicating the UE being an MO only device, obtaining a user configuration information indicating the UE being an MO only device, receiving an configuration via OTA indicating the UE being an MO only device, and obtaining a default subscription information in a SIM of the UE indicating the UE being an MO only device; and performing a procedure-based power consumption optimization for the identified MO only traffic transmission procedure, wherein the procedure-based power consumption optimization is for the identified MO only traffic transmission is based on the MO only traffic characteristic.

8. The method of claim 7, wherein the MO only traffic transmission procedure is an attach procedure, and wherein the power consumption optimization comprises:
performing the attach procedure right before the data transmission; and
performing a detach procedure right after the data transmission.

9. The method of claim 7, wherein the transmission procedure is sending an amount of data, and wherein the power consumption optimization involves switching off RF capability after sending the amount of data until a next sending data request.

10. The method of claim 7, wherein the transmission procedure is an attach procedure or a detach procedure, and wherein the power consumption optimization involves indicating attach-when-needed capability in NAS ATTACH REQUEST message or NAS DETACH REQUEST message.

11. The method of claim 7, wherein the transmission procedure is a detach procedure initiated by the wireless network without indicating reattach required, and wherein the power consumption optimization involves not reattempting an attach procedure.

12. The method of claim 7, wherein the transmission procedure is sending a predefined NAS message, and wherein the power consumption optimization involves indicating MO-service-only in an additional update information element (IE) or other fields of the NAS message.

13. The method of claim 7, wherein the transmission procedure is sending an attach-when-needed indication in an ATTACH REQUEST message and receiving an implicit detach supported indicator in an ATTACH ACCEPT message, and wherein the power consumption optimization involves performing a local detach procedure without exchanging detach signaling messages.

14. The method of claim 7, wherein the transmission procedure is sending an attach-when-needed indication in an ATTACH REQUEST message and receiving an implicit detach supported indicator and an implicit detach timer value in an ATTACH ACCEPT message, and wherein the power consumption optimization comprises:
starting an implicit detach timer upon RRC release completion; and
performing a local detach procedure without exchanging detach signaling messages upon the implicit detach timer expires.

* * * * *